United States Patent [19]
Spillett

[11] Patent Number: 4,735,011
[45] Date of Patent: Apr. 5, 1988

[54] HUMANE ANIMAL TRAP

[76] Inventor: Dwayne J. Spillett, Box 783, Nelson, British Columbia, Canada, V1L 5R4

[21] Appl. No.: 64,956

[22] Filed: Jun. 22, 1987

[51] Int. Cl.⁴ ............................................. A01M 23/24
[52] U.S. Cl. ..................................................... 43/86
[58] Field of Search .................. 43/86, 85, 77, 78, 79, 43/80

[56] References Cited

U.S. PATENT DOCUMENTS

| | | | |
|---|---|---|---|
| 400,324 | 3/1889 | Gilmore | 43/86 |
| 876,759 | 1/1908 | Young | 43/86 |
| 1,805,317 | 5/1931 | Schober | 43/86 |
| 1,989,174 | 1/1935 | Schwenk | 43/86 |
| 2,284,543 | 5/1942 | Stilson | 43/86 |
| 3,835,576 | 9/1974 | Steiner | 43/86 |
| 4,425,732 | 1/1984 | Kania | 43/85 |
| 4,471,560 | 9/1984 | Hughan | 43/86 |

Primary Examiner—Gene P. Crosby
Attorney, Agent, or Firm—Townsend & Townsend

[57] ABSTRACT

An animal trap having a hollow body with an opening at one end. A compartment to receive bait is located at the other end of the body. There is a striking surface at one side of the opening and a trap jaw extends into the opening adjacent the striking surface. The jaw is shaped to correspond generally to the inside of the opening. A spring moves the trap jaw towards the striking surface. A trigger is pivotally arranged within the body. A catch on the trigger engages the trap jaw and the trap jaw can be engaged in the catch to form a set position for the trap. Movement of the trigger releases the trap jaw from the catch to allow the trap jaw to move under the influence of the spring towards the striking surface.

11 Claims, 1 Drawing Sheet

HUMANE ANIMAL TRAP

FIELD OF THE INVENTION

This invention relates to an animal trap.

DESCRIPTION OF THE PRIOR ART

Animal traps for capturing fur bearing animals are well known. In recent years, due to public opinion, animal traps have become more humane; that is designers have moved away from the older style of leg hold traps where the trapped animal faced a lingering death to a style of trap where the animal is quickly killed so that it does not suffer. Generally, a quick and clean killing is achieved by breaking the animal's neck using a spring loaded killing loop. There are numerous examples of this type of humane trap. U.S. Pat. Nos. 400,324; 2,284,543; 1,805,317; 4,471,560 and 4,425,732 all show humane animal traps comprising a container with a spring loaded killing loop at its entrance. Other prior art known to the applicant includes U.S. Pat. Nos. 2,510,655 and 4,633,610.

SUMMARY OF THE INVENTION

The present invention is an animal trap comprising:
a hollow body having an opening at a first end;
a compartment to receive bait at a second end of the body;
a striking surface at one side of the opening;
a trap jaw extending into the opening adjacent the striking surface and shaped to correspond generally to the inside of the opening;
a spring to move the trap jaw towards the striking surface;
a trigger pivotally arranged within the the body; and
a catch on the trigger to engage the trap jaw whereby the trap jaw can be engaged in the catch to form a set position for the trap and movement of the trigger releases the trap jaw form the catch to allow the trap jaw to move under the influence of the spring towards the striking surface.

DESCRIPTION OF THE PREFERRED EMBODIMENTS

Figure 1:
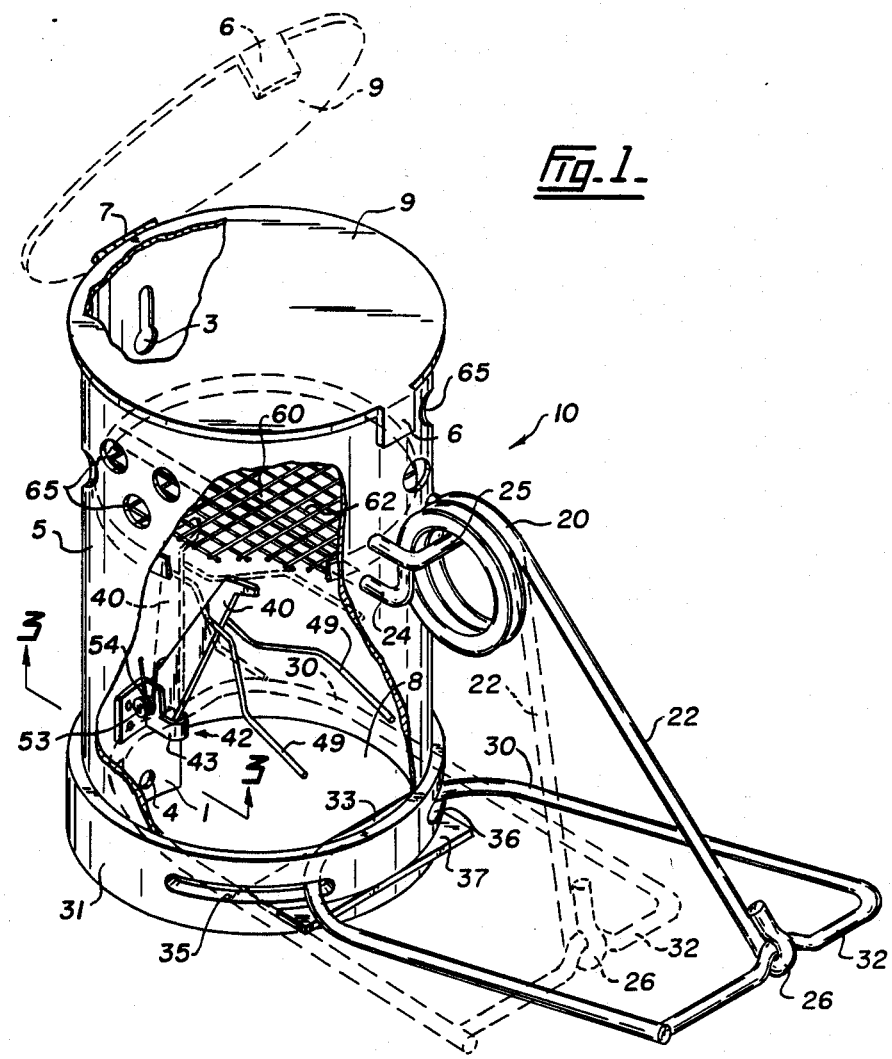
FIG. 1 is an isometric view of the trap with cutaway sections.

FIG. 1 illustrates a trap according to one embodiment of the invention. The trap 10 is a cylindrical container 5 with an open lower end 8 and an upper end capped by cover plate 9 attached to container 5 by hinge 7. Latch 6 with appropriate locking means (not shown) allows cover plate 9 to be locked shut. The trap is designed to be affixed to any suitable vertical support such as a tree or post by hanging the trap on nails driven into the support. Nail slot 3 near the upper end of container 5 and nail hole 4 through flange 1 at lower end 8 allow the trap 10 to be hung on nails and secured in position with open lower end 8 facing downwardly. The overall dimensions of the trap 10 can be varied depending on the type and size of animal to be caught.

Coiled spring 20 with first limb 22 and second limb 24 is attached to the front wall of container 5 by U-shaped retaining member 25. Second limb 24 of spring 20 extends through the front wall of cylindrical container 5, across the container's interior, and through the opposite wall of the container and assists in locating coil spring 20 in place. First limb 22 extends outwardly from coil spring 20 and the distal end of first limb 22 is formed into hook 26 by bending the end back on itself. Hook 26 engages the midpoint of cross member 32 of trap jaw 30. Trap jaw 30 is an essentially rectangular steel wire loop with a rounded lower edge shaped to conform to the cylindrical interior of container 5. Trap jaw 30 extends through jaw slots 35 and 36 cut in reinforcing collar 31 into the interior of container 5 just inside open lower end 8. As shown in FIG. 1, trap jaw 30 can move between the set position shown in dashed lines and the released position shown in solid lines.

Just below the point of entry of trap jaw 30 into the interior of container 5 is a striking surface or killing bar 37 mounted in the front wall of container 5. Ths killing bar serves as a sharp edge against which the animal's neck is broken by the movement of trap jaw 30.

Figure 3:
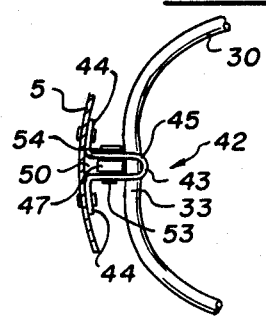
FIG. 3 is view along line 3—3 of FIG. 1 showing the present invention's trigger and anchor assembly in detail.
Figure 4:
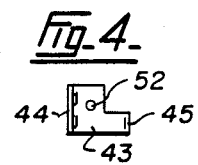
FIG. 4 is a side view of the anchor assembly.

Opposite jaw slots 35 and 36 and killer bar 37, and adjacent to open lower end 8, is trigger 40 pivotally mounted to anchor 42 which is rigidly attached to the inside surface of container 5 in any suitable manner. Anchor 42 as shown in FIG. 3 comprises an inverted U-shaped structure 43 with attachment flanges 44 through which appropriate fasteners extend to attach the anchor to the wall of the container 5. When seen from the side, inverted U-shaped structure 43 has the L-shaped profile shown in FIG. 4, where lobe 45 is positioned adjacent to open end 8. Holes 52 extend through both side of U-shaped structure 43.

As best shown in FIG. 3, trigger 40 comprises a longitudinal member with tab 47 and catch 48 formed at the member's lower end. Hole 51 is also drilled through tab 47. Attached toward the opposite end of trigger 40 are feelers 49, best shown in FIG. 1, which ensure that any animal entering the trap will contact the trigger.

Figure 2:
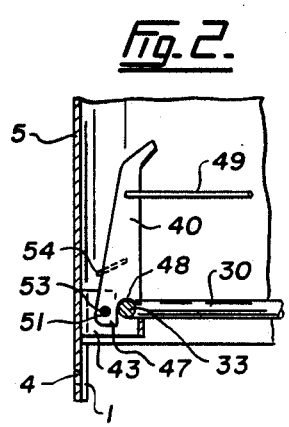
FIG. 2 is a close up view of the present invention detailing how the trigger engages the trap jaw when the trap is in the set position.

Tab 47 of trigger 40 is fitted into cavity 50 of inverted U-shaped structure 43 of anchor 42. Pin 53, inserted through hole 52 in a first wall of U-shaped structure 43, through hole 51 in tab 47 of trigger 40, and through hole 52 in the opposite wall of U-shaped structure 43, pivotally connects trigger 40 to anchor 42. Pivoting of trigger 40 about pin 53 allows catch 48 to hold and release cross member 33 of trap jaw 30. Biasing spring 54, anchored about pivot pin 53, extends upwardly parallel to trigger 40 and is then bent under and around trigger 40 as shown in FIG. 2. Biasing spring 54 ensures that trigger 40 is rotated in a clockwise direction about pin 53 as viewed in FIG. 2, thus causing catch 48 to engage and hold cross member 33 of trap jaw 30 in the set position until trigger 40 is disturbed by an animal.

At the upper end of container 5 is bait area 60 separated from the lower portion of trap 10 by mesh screen 62 screen 62, with an upwardly bent circumferential edge, rests on second limb 24 of coiled spring 20. By opening cover plate 9, bait can be place onto screen 62. When cover plate 9 is closed and locked using latch 6, the bait can be smelled and seen through holes 65 drilled into the sides of container 5, and through screen 62 in the interior of the trap, however, the bait is inaccessible to any attracted animal.

In use, the trap is suspended from a tree or other vertical support using nail slot 3 and nail hole 4 with open lower end 8 facing downwardly. Bait is placed on screen 62 and cover plate 9 is sealed shut using latch 6. The trap is set by gripping cross member 32 of released trap jaw 30 and pushing the trap jaw through slots 35 and 36 and across the internal diameter of container 5 just above open lower end 8. As trap jaw 30 is pushed across open lower end 8, energy is stored in coiled spring 20 until jaw cross member 33 engages catch 48 of trigger 40. Due to the action of biasing spring 47 rotating trigger 40 in a clockwise direction about pin 53 as viewed in FIG. 2, catch 48 traps and holds jaw cross member 33 and prevents coiled spring 20 from snapping the trap jaw back to its released position. The trap is now in the set postion as shown by the dashed lines in FIG. 1.

When an animal approaches trap 10, attracted by the bait, the only approach to the bait on screen 62 is through open lower end 8. When the animal inserts its head through open lower end 8 into the interior of container 5 in an attempt to get closer to the bait, it is inevitable that the nimal will brush against trigger 40 or feelers 49 causing trigger 40 to rotate counterclockwise about pin 53 as viewed from FIG. 2. This causes catch 48 to release jaw cross member 33 allowing trap jaw 30 to snap toward its released position due to the influence of coiled spring 20. Spring 20 is relatively strong and causes trap jaw 30 to return with sufficient force to break the animal's neck against killing bar 37 thereby killing the animal. If this blow is not fatal it nearly always renders the animal unconscious and death results from restriction of the blood supply to the brain or air supply.

Obviously, the dimensions of trap 10 will vary depending on the animal the trap is designed for.

I claim:

1. An animal trap comprising:
   a hollow body having an opening at a first end;
   a compartment to receive bait at a second end of the body;
   a striking surface at one side of the opening;
   a trap jaw extending into the opening adjacent the striking surface and shaped to correspond generally to the inside of the opening;
   a spring to move the trap jaw towards the striking surface;
   a trigger pivotally arranged within the body; and
   a catch on the trigger to engage the trap jaw whereby the trap jaw can be engaged in the catch to form a set position for the trap and movement of the trigger releases the trap jaw form the catch to allow the trap jaw to move under the influence of the spring towards the striking surface.

2. A trap as claimed in claim 1 in which the hollow body is a cylinder.

3. A trap as claimed in claim 1 in which the compartment has a closable cap so that bait may be placed with the compartment;
   openings in the sides of the compartment; and
   a perforate wall separating the compartment from the remainder of the body.

4. A trap as claimed in claim 1 in which the spring is a coil spring anchored to the exterior of the body.

5. A trap as claimed in claim 4 in which the coil spring has a first limb extending through the body to assist in locating the spring;
   a second limb extending from the coil and formed with a recess at its distal end.

6. A trap as claimed in claim 5 in which the trap jaw is of generally rectangular shape and adapted to pivotally engage the recess in the second limb of the coiled spring, but formed with a rounded end remote from the second limb to conform to the interior of the opening of the body.

7. A trap as claimed in claim 1 including elongated slots in the body to allow the trap jaw to pass into the body and to traverse the opening at the first end of the body.

8. A trap as claimed in claim 1 in which the trigger is pivotally attached to an anchor adjacent the opening and opposite the striking surface.

9. A trap as claimed in claim 1 in which the trigger is biased by a pring so that the catch will tend to engage the trap jaw when the trap jaw is in the set position.

10. A trap as claim in claim 8 in which the catch is a recess able to receive the trap jaw, pivoting of the trigger relative to the anchor acting to close and open the recess to engage and release the trap jaw member.

11. A trap as claim in claim 1 in which the trigger includes an extension to ensure contact with an animal entering the trap.

* * * * *